United States Patent [19]

Nordlund

[11] Patent Number: 4,724,331
[45] Date of Patent: Feb. 9, 1988

[54] METHOD AND APPARATUS FOR STARTING AN AIRCRAFT ENGINE

[75] Inventor: Lester H. Nordlund, Federal Way, Wash.

[73] Assignee: The Boeing Company, Seattle, Wash.

[21] Appl. No.: 832,778

[22] Filed: Feb. 25, 1986

[51] Int. Cl.[4] .............................................. H02P 7/00
[52] U.S. Cl. ................................. 290/38 R; 290/38 C; 290/38 E; 290/27; 290/28
[58] Field of Search ............... 290/38 R, '38 C, 38 E, 290/27, 28, 10, 18, 22, 31, 46–48; 123/179 R, 179 D, 179 AS

[56] References Cited

U.S. PATENT DOCUMENTS

| | | | |
|---|---|---|---|
| 459,772 | 9/1891 | Tesla | 318/137 |
| 920,843 | 5/1909 | Eichberg | 318/726 |
| 1,103,672 | 7/1914 | Heany | 290/35 |
| 1,127,464 | 2/1915 | Lundell | 318/45 |
| 1,194,607 | 8/1916 | Naldini et al. | 290/36 R |
| 1,196,154 | 8/1916 | Rosenberg | 318/45 |
| 1,279,907 | 9/1918 | Reinhold | 290/4 C |
| 1,293,646 | 2/1919 | Kurtz | 290/12 |
| 1,313,078 | 8/1919 | Emmet | 318/739 |
| 1,313,079 | 8/1919 | Emmet | 318/739 |
| 1,313,102 | 8/1919 | MacMillan | 318/45 |
| 1,331,940 | 2/1920 | Hobart | 318/47 |
| 1,547,635 | 7/1925 | Akers | 290/35 |
| 1,640,753 | 8/1927 | Chryst | 290/37 R |
| 1,644,065 | 10/1927 | Lanquetin | 122/356 |
| 1,774,492 | 8/1930 | Thorne | 172/274 |
| 2,284,469 | 5/1942 | Clymer et al. | 172/274 |
| 2,529,921 | 11/1950 | Davolt | 123/179 |
| 2,539,791 | 1/1951 | Mozzanini et al. | 318/92 |
| 2,579,126 | 12/1951 | Pielstick | 290/4 |
| 3,753,069 | 8/1973 | Newton | 318/440 |
| 3,927,359 | 12/1975 | Chen | 290/38 R X |
| 4,315,442 | 2/1982 | Cordner | 74/687 |
| 4,330,743 | 5/1982 | Glennon | 322/10 |

FOREIGN PATENT DOCUMENTS 1136539  9/1962  Fed. Rep. of Germany .

Primary Examiner—William M. Shoop, Jr.
Assistant Examiner—Sharon D. Logan
Attorney, Agent, or Firm—Bruce A. Kaser

[57] ABSTRACT

A pair of electrical generators (14,16) are installed on a jet engine (10). The generators (14,16) are coupled to each other in a manner so that together they can be used as crank motors to start the engine.

7 Claims, 1 Drawing Figure

U.S. Patent
Feb. 9, 1988
4,724,331
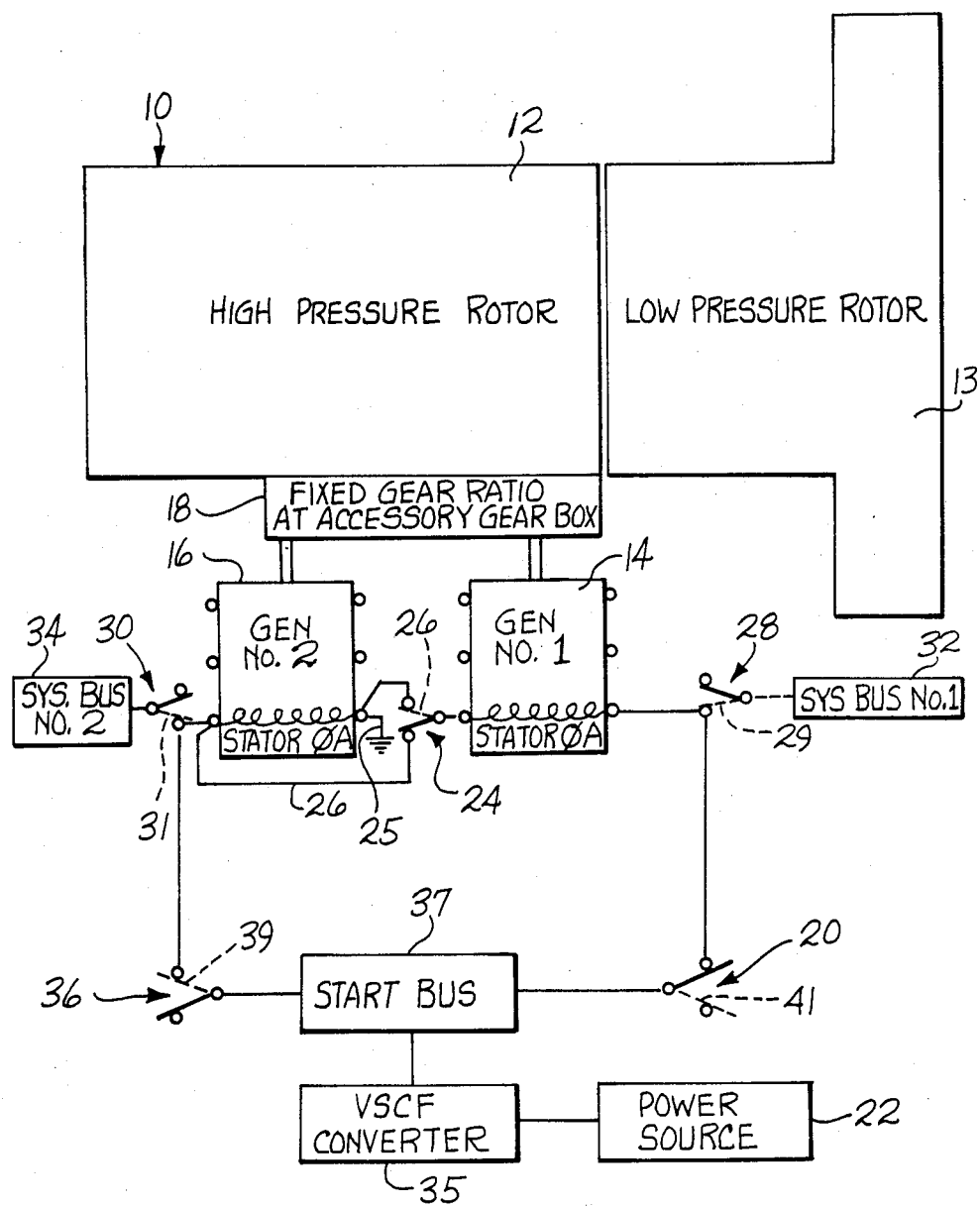

METHOD AND APPARATUS FOR STARTING AN AIRCRAFT ENGINE

DESCRIPTION

1. Technical Field

This invention relates to electro/mechanical systems which are used to start engines. More particularly, the invention relates to a method and apparatus for using electrical generators normally installed on an aircraft engine to start the engine.

2. Background Art

Aircraft are much like automobiles in at least one respect. If an aircraft can be constructed that is lighter in weight, or if certain weight penalties on an aircraft can be eliminated, the aircraft's range and/or fuel efficiency can be increased. For this reason, there is a continuing trend among aircraft designers to build lighter and more efficient aircraft at reduced cost. Part of this trend includes attempts to significantly reduce or eliminate aircraft weight penalties normally associated with the utilization of hydraulic or pneumatic power extraction systems. At least one approach toward eliminating these kinds of penalties has been to implement, as replacement systems, electric systems which are generally lighter and lower in cost. For this reason, as new generations of aircraft are designed, it is anticipated that such aircraft will become "more electric" and will utilize hydraulic and pneumatic systems to a lesser extent.

Most present-day commercial aircraft have only one electrical generator installed on each engine. Each generator is typically integrated with a hydro-mechanical constant speed drive (IDG) that converts variable engine speed to a constant output speed for the purpose of driving the generator. This permits a generator to operate at a constant frequency, which is typically 400 Hz, for example.

A known problem with the IDG is that it precludes integration of engine and generator cooling systems. Further, there are known cost and reliability problems associated with using the IDG. Because of this, IDGs which provide 400 Hz power are being replaced by electronic power convertors, which are often referred to as "variable speed constant frequency" or VSCF power convertors.

When VSCF convertors are used, the associated aircraft generator is hard coupled to the high pressure rotor of the engine by means of a fixed gear ratio linkage. The gear ratio is usually selected so that it will limit the maximum generator speed to approximately 20,000–30,000 rpm. The recent development of high current power transistors have made it possible, with only minor modifications, to also use a VSCF power convertor to control electrical power at the current level required to make the "generator" operate as an engine crank motor.

An onboard electric crank or starter motor has not yet been utilized in large commercial aircraft; perhaps because of excessive cost, weight and lack of the above-mentioned high current power transistors. For example, modern large-sized commercial aircraft (exceeding one hundred passengers in capacity) typically use a pneumatic ground power cart which supplies pressurized air to a dedicated air starter motor. As would be familiar to a person skilled in the art, the air starter motor cranks an aircraft motor on the ground. If, for some reason, an engine is shut down or fails during flight, the usual way to restart the engine is to crank the engine by means of ram air feeding into the engine duct; which has a wind milling effect on engine turbine blades. However, sometimes a low airspeed/altitude condition requires crank assistance by crossfeeding bleed air from another operating engine to the failed engine's air starter motor. An advantage to having a generator act as a crank motor would be that a separate dedicated pneumatic starter may be deleted from the engine accessory box.

Recent improvements in jet engine efficiency and the recent introduction of the prop-fan engine have reduced engine inertia and drag torque characteristics. This means that generator ratings (based on normal load demands) are becoming more compatible for use as engine crank motors. This, in conjunction with the development of new transistors, has made the potential use of generators as engine crank motors more attractive.

Because of the trend toward greater electrification in aircraft, it is anticipated that the next generation of aircraft may require larger generating capacity on each aircraft engine. For example, if a General Electric GE36P prop-fan engine is used on these aircraft, each engine may have two 75 KVA generator/convertor system for providing power to the various aircraft electrical systems. A generator and convertor system rate at 75 KVA at the convertor terminals must have a generator rating of approximately 87 KVA at the generator's terminals, in order to compensate for convertor losses. A computer simulation of the GE36P engine has shown that it can be started within 35 seconds on a standard 59° F. day by a generator used as a crank motor, wherein the generator/crank motor has a continuous terminal rating of approximately 70–80 KVA. Therefore, a single generator used in a 75 KVA generator/convertor system would be adequate to start this type of engine during such relatively normal conditions.

Other computer simulations have shown that a generator terminal rating of approximately 76–85 KVA would be required to start the GE36P engine within 100 seconds on a minus 40° F. day, such starting time being acceptable in view of the given environment. Further, it is anticipated that it will be a design requirement to start an engine at minus 65° F. It has been estimated that to meet this requirement using a generator as a crank motor may require a generator terminal rating in excess of 90 KVA. Therefore, a single generator in the above-mentioned 75 KVA system would be inadequate for starting this engine during minus 65° F. conditions. Still further, if the engines used in the next generation of aircraft are fan jet engines, which have increased inertia and drag torque characteristics, it is likely that the generator terminal rating required to crank such an engine could be as high as approximately 150 KVA.

Because of the above considerations, an ongoing debate has arisen among aircraft designers concerning how to achieve acceptable crank torque capabilities during worst case conditions. Several options have been considered, all of which are compatible with the anticipated new generation aircraft electrical systems. However, there are disadvantages associated with each. One suggested option, for example, is to retain the presently used integrated drive generator (IDG) by increasing its operative rating. Still another suggested option contemplates increasing VSCF generator terminal and power feeder ratings as may be required to provide acceptable crank torque. Still another suggested option is to use two VSCF generator systems connected together in a parallel arrangement to provide the necessary additional crank torque. Each of these options results in either additional weight or reliability penalties, which is undesirable. The present invention provides a new way of starting an engine which may be used as an alternative to and provides advantages over these three above-described options.

DISCLOSURE OF THE INVENTION

This invention is meant to be used in conjunction with fan-jet or prop-fan engines having a pair of identical generators installed thereon. Usually, the capacity of one generator or generator system per engine is adequate for supplying the essential power requirements of the anticipated "more-electric" or new generation aircraft. However, on this type of aircraft two generator systems will be required per engine to provide essential power source redundancy, and to supply interruptible power to certain utility power loads (galleys, entertainment, etc.) during normal aircraft operation.

It is well known by those skilled in the art that an AC generator can be used as an induction or synchronous motor to provide a variable speed shift output by using an appropriate power convertor. When this principle is applied to an aircraft engine, the concept of using a generator as an engine crank motor or starter is immediately defined in general terms. However, efficient starting of an engine by this method requires a power convertor which can precisely control the voltage/frequency (V/F) ratio as the back EMF increases with engine speed.

In the present invention, the above-mentioned pair of generators are installed on an engine and are connected mechanically in parallel. To start the engine, the generators are supplied with electrical current at a controlled V/F ratio to cause each generator to function as an electric start motor that cranks the engine. Preferably, current is controlled by a variable speed constant frequency (VSCF) power convertor. The generators are connected electrically in series and are used together to crank the engine at the same time.

Two possible approaches may be used to accomplish the above series generator connection. One approach is to use the generators as induction crank motors. This eliminates the need for a rotor field current with a resultant simplification of the motor controls. However, this approach could cause an approximate 5% generator weight increase because the Amortisseur winding and iron core of this type of motor must be slightly modified for operation as a "squirrel cage" induction motor.

The other approach is to use the generators as synchronous crank motors. This requires greater control complexity and further requires that the motor's input shaft and stator windings be phase controlled. The rotor and stator portions of one generator must be mechanically and electrically in phase with the rotor and stator portions of the other generator. The advantage to the synchronous approach is that it may not cause a weight penalty. Either approach, however, adequately overcomes the deficiencies mentioned previously in the background art portion of this application.

BRIEF DESCRIPTION OF THE DRAWINGS

In the drawings:

FIG. 1 is a schematic drawing showing two generator stator windings connected electrically in series, and connected mechanically in parallel via their respective rotors to an accessory gear box of either a fan-jet or prop-fan engine, in accordance with a preferred embodiment of the present invention.

BEST MODE FOR CARRYING OUT THE INVENTION

The description which follows is directed toward a specific application wherein two identical generators are mechanically connected in parallel to an engine accessory gear box that has the capability of functioning as an engine crank gear box. A person skilled in the art would be familiar with this type of connection, and further, a person skilled in the art would be familiar with the connection of a generator rotor to this type of engine gear box.

Referring now to FIG. 1, therein is shown a schematic representation of either a fan-jet or prop-fan engine 10. The engine has a high pressure rotor 12 and a low pressure rotor 13. The high pressure rotor 12 is normally cranked during an engine start operation—in contrast to the low pressure rotor 13 which is not cranked. Operatively attached to the high pressure rotor 12 via an accessory gear box 18 are first and second generators 14, 16. The high pressure rotor 12 is mechanically connected to the accessory gear box 18 at a fixed gear ratio. As would be well familiar to a person skilled in the art, two output shaft splines in the accessory gear box are connected to the two generators 14, 16. if the previously-mentioned synchronous crank motor approach is used to couple the generators 14, 16 together, then these shaft splines are keyed accordingly for phase control of the generators.

To start the engine 10, the two generators 14, 16 are first disconnected from their related power system buses 32, 34, by means of generator circuit breakers 28, 30 (GCB1, GCB2). These power buses 32,34 normally transmit power to various aircraft electrical systems when the generators 14, 16 are in the generating mode. In the engine start mode, contactor 24 is moved downwardly into the "S" position as shown in FIG. 1. Then, a variable speed constant frequency (VSCF) power convertor 35 converts electricity from an input power source 22 to a controlled voltage/frequency ratio, which energizes a start bus 37. The controlled voltage/frequency electric power is transmitted to the generators 14, 16 via contactors 20, 24 which cause the generators to create crank torque. This torque is delivered to the rotor 12 by means of the accessory gear box 18.

The circuit represented in FIG. 1 is a single phase representation for each additional generator electrical phase (usually a total of three). Another contactor 36 is normally open as shown when both generators 14, 16 are used together for cranking. An airframe ground plane is shown at 25 which is functional for either the engine start mode or the generating mode.

Two optional start modes are also illustrated in the drawing, wherein either one of the two generators individually may be used as a crank motor at any one time. For example, one of the generators 14 may be used when only light cranking loads are required by operating the contactor switch 24 to the "N" position, as shown by the dashed lines 26 and retaining contactor switch 20 in the noted position. As an alternative, the other generator 16 could also be used as a single crank motor by closing the contactor switch 36 in the manner indicated by the dashed lines 39. In this case, however, the contactor switch 20 would also be moved into an open position as shown by the dashed lines 41. It should be appreciated that if a single generator is used to crank the engine 10, the VSCF convertor 35 would be required to provide twice the electric current level and twice the wasted heat dissipation of a more efficient arrangement wherein both generators are series connected to crank the engine. It is anticipated that both generators 14, 16 will be required for starting the engine 10 during cold ambient conditions. Obviously, both could be used during warm ambient conditions in order to reduce heat dissipation in the generators 14, 16 and the VSCF convertor 35.

Certain engine starting conditions may arise where it is useful to use both generators 14, 16 when cranking the engine 10 from zero rpm to approximately 50% of engine idle rpm. At 50% engine idle, two generator cranking may continue at reduced field current and reduced torque or the cranking may continue with one only generator. To crank with one generator, contactor 24 is returned to position "N" and only one of the generators 14, 16 completes cranking the engine 10 up to a higher starter cutout rpm. When the starter cutout rpm is reached, the contactor 20 is opened (contactor 36 would already be open) and the generator circuit breakers 28 and 30 are subsequently returned to the dotted positions 29 and 31. The generators 14, 16 are then operative to provide electrical power to the aircraft power system buses 32, 34.

The above-described switching changes or changes in contactor positions would be familiar to a person skilled in the art. The actual control of the contactors would be accomplished by suitable utilization of a microprocessor (not shown in the drawings) located in the engine start control module onboard the aircraft. Along this line, any additional non-baseline electronics dedicated for use only in conjunction with the invention would be minimal in nature, and consequently, so would any weight penalty associated with such electronics.

A description of a preferred embodiment of the invention has been presented above for illustrative purposes only. It is to be understood that other embodiments of the invention may exist, or may be developed, which do not depart from the spirit and scope of the invention. The scope of patent protection for this invention is to be limited only by the patent claims which follow, in accordance with the established doctrines of patent claim interpretation.

What is claimed is:

1. In an aircraft having a prop-fan or fan-jet engine, and a pair of electrical generators installed mechanically in parallel on said engine, wherein said generators may each be supplied with electrical current at a controlled voltage/frequency ratio to cause each generator to function as an electric start motor that cranks said jet engine to start it, a method of starting said engine, comprising:
    coupling said pair of generators together electrically in series; and
    using said coupled generators together to crank said engine to start said engine; including using said coupled generators together to crank said engine until said engine reaches 50% of engine idle rpm; and followed by
    using only one of said generators until said engine reaches a starter "cut-out" rpm such that said engine can continue to run on its own without further cranking.

2. The method of claim 1, wherein said generators each have a rotor portion and a stator portion, and wherein coupling said pair of generators together includes:
    coupling the rotor and stator portions of one generator mechanically and electrically in phase with the rotor and stator portions of the other generator.

3. The method of claim 1, wherein each generator has an iron core and an Amortisseur winding, and wherein coupling said pair of generators together includes:
    modifying said iron core and Amortisseur winding of each generator in a manner so that each generator functions as a squirrel cage induction motor.

4. In an aircraft having a prop-fan or fan-jet engine, and a pair of electrical generators installed mechanically in parallel on said engine, wherein said generators may each be supplied with electrical current at a controlled voltage/frequency ratio to cause each generator to function as an electric start motor that cranks said jet engine to start it, a method of starting said engine, comprising:
    coupling said pair of generators together electrically in series; and
    using said coupled generators together to crank said engine to start said engine, including using said coupled generators together to crank said engine until said engine reaches a certain rpm corresponding to a certain preselected percentage of said engine's idle rpm, such that said engine is sufficiently operable to aid in engine cranking; and followed by
    using only one of said generators until said engine reaches a starter "cut-out" RPM such that said engine can continue to run on its own without futher cranking.

5. The method of claim 4, wherein said preselected percentage is 50% of engine idle rpm.

6. The method of claim 4, wherein said generators each have a rotor portion and a stator portion, and wherein coupling said pair of generators together includes:
    coupling the rotor and stator portions of one generator mechanically and electrically in phase with the rotor and stator portions of the other generator.

7. The method of claim 4, wherein each generator has an iron core and an Amortisseur winding, and wherein coupling said pair of generators together includes:
    modifying said iron core and Amortisseur winding of each generator in a manner so that each generator functions as a squirrel cage induction motor.

* * * * *